Dec. 8, 1925.

E. G. DUDLEY 1,564,836

CONTROL SYSTEM FOR THREE-UNIT TURBINE EXCITER SETS

Filed Nov. 10, 1923

Inventor:
Elbridge G. Dudley,
by
His Attorney.

Patented Dec. 8, 1925.

1,564,836

UNITED STATES PATENT OFFICE.

ELBRIDGE G. DUDLEY, OF SCHENECTADY, NEW YORK, ASSIGNOR TO GENERAL ELECTRIC COMPANY, A CORPORATION OF NEW YORK.

CONTROL SYSTEM FOR THREE-UNIT TURBINE EXCITER SETS.

Application filed November 10, 1923. Serial No. 674,066.

*To all whom it may concern:*

Be it known that I, ELBRIDGE G. DUDLEY, a citizen of the United States, residing at Schenectady, county of Schenectady, State of New York, have invented certain new and useful Improvements in Control Systems for Three-Unit Turbine Exciter Sets, of which the following is a specification.

The present invention relates to a control system for three-unit turbine exciter sets of the type commonly used in power plants to supply field excitation for large turbo-alternators. Such exciter sets usually comprise a direct current generator or exciter, a small steam turbine and an alternating current motor on a common supporting base. The alternating current motor is usually designed to operate at a higher speed than the turbine and therefore carries the load, while the turbine under control of its operating governor serves as an auxiliary source of power in the case of failure of the current supply to the motor.

In connection with the operation of exciter sets of this type, it is usually provided that failure of the current supply will cause a tripping of the motor control device, usually a starting compensator, through the operation of a no-voltage release or like mechanism with which, as a rule, such control devices are fitted. This disconnects the motor from the supply line and prevents an inrush of current and damage to the motor when power is restored, in case the set should have come to rest through failure of the turbine steam supply along with the current supply.

Such safety devices, however, require the attention of an operator when, after power is restored, it is desired to again place the set in normal operation; that is, to enable the motor to carry the load it is necessary for an operator to reclose the control device each time it trips open.

The present invention has for its object the provision of an improved arrangement in control systems usually employed with three unit turbine exciter sets whereby continuous operation of the set is obtained without requiring the attention of an operator and without impairing any of the protective features of system employed.

For a consideration of what is believed to be novel and the invention, attention is directed to the accompanying drawing, description thereof and the appended claims.

Figure 1:
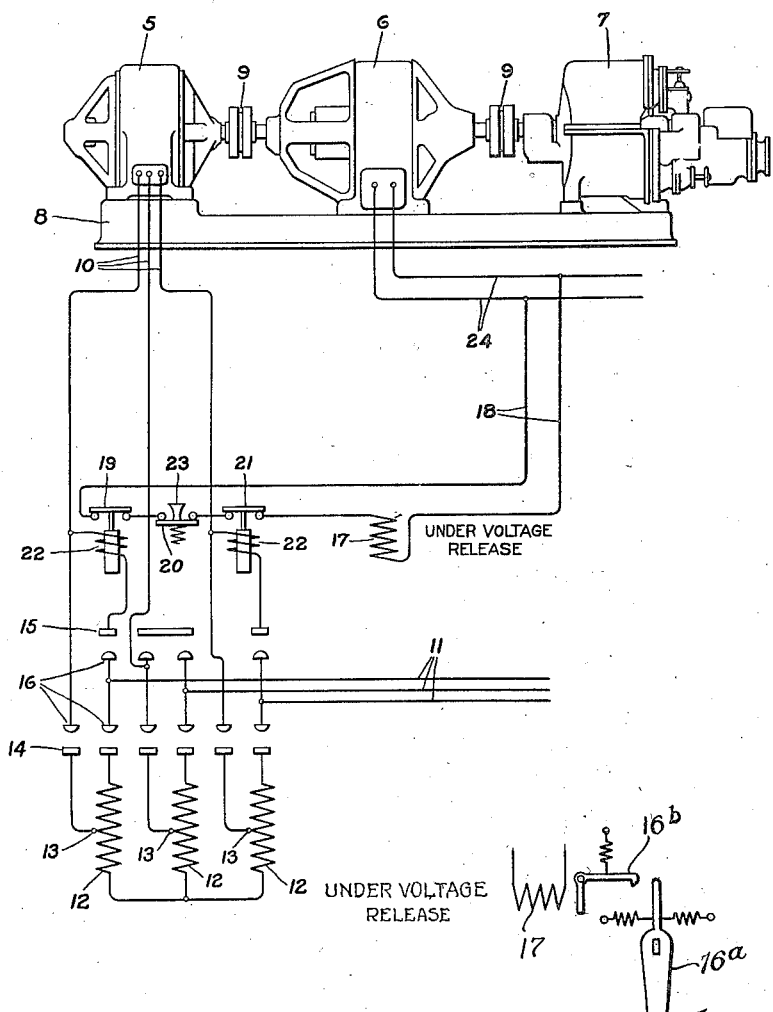
Figure 2:

In the drawing, Fig. 1 is a diagrammatical representation of a three unit turbine exciter installation provided with a control system embodying the invention, and Fig. 2 is a similar representation of a detail thereof.

Referring to the drawing, 5 is a motor, 6 is a generator or exciter and 7 is a turbine or prime mover. These are mounted with their shafts in alignment on a common supporting base 8 and are connected together by flexible shaft couplings 9. The three units make up an exciter set which may be taken as representing any three unit turbine exciter set comprising a suitable driving motor, turbine and generator.

In the present example, the driving motor is a three-phase induction motor supplied with current through a set of three-phase leads 10 from supply mains, indicated at 11.

Between leads 10 and the supply mains, a suitable starting, controlling and protective device for the motor is connected in circuit. This is indicated by a circuit diagram as a three-phase starting compensator comprising the usual Y-connected auto-transformers 12 provided with low voltage starting taps 13, starting contacts 14, running contacts 15 and movable contacts 16. These last-named contacts are mounted on an insulated, movable carrier 16ª by means of which they may be thrown simultaneously from the neutral or off position shown, in one direction into contact with the starting contacts 14 and in the opposite direction into contact with the running contacts 15. When contacts 16 are thrown into the running position, the moving carrier is locked by the action of a no-voltage or under-voltage release coil 17 which causes a suitable latch arrangement indicated at 16ᵇ to engage therewith while said coil is properly energized as hereinafter pointed out.

The coil 17 is energized through a separate circuit 18 in which are included three normally closed switches 19, 20 and 21, in series. The opening of any one of these switches opens the circuit, deenergizes the coil 17 and permits the latch arrangement to release and trip the compensator to the open position, indicated in the diagram.

Switches 19 and 21 are gravity closed and are connected with and form parts of relays 22 inserted in the running legs of the motor circuit. These relays are of the solenoid type and in response to overload current in the motor circuit cause the switches 19 and 21 to open and trip the compensator through deenergization of coil 17.

Switch 20 is spring closed and is manually opened by pressing a stop button 23 connected with it. This serves as a convenient means for stopping the motor as it effects a tripping of the compensator in the same manner as the opening of either of switches 19 and 21 by action of the relays 22.

The circuit 18 is connected with the exciter output mains indicated at 24. The coil 17 is thus energized by the exciter and is designed to operate at the normal voltage of the exciter and to hold the starting device of the motor in the running position when the exciter is delivering a voltage above a predetermined percentage of normal voltage, for example above 80% of normal voltage. Thus the motor control device does not release on failure of the supply, provided that the exciter is operating.

The motor and turbine are usually designed to operate at slightly differing normal speeds, one with respect to the other, with the motor speed the higher. The turbine governor may be adjusted to provide, within limits, any desired difference between the operating speed of the turbine and the motor. It is usually set to function and supply steam to the turbine when the motor speed for any reason drops but slightly, for example, 3% below normal speed. Thus the turbine takes up the load immediately upon failure of the motor supply or in case overload brings the motor speed down the predetermined percentage.

The set may be started from either the motor or turbine end, but usually the turbine is started first and the set brought up to speed by it. The motor compensator is then thrown successively from the open position to the starting and then to the running position, or the compensator may be thrown directly to the running position in this case, as the running speed of the induction motor is but slightly higher than that of the turbine. When the motor is connected to the line the speed of the set is increased from the turbine speed to that of the motor with the result that the motor carries the load while the turbine is cut off by its governor and idles. Upon failure of the motor supply the speed of the set tends to decrease. When the normal speed of the turbine, or slightly less is reached, the turbine governor admits steam and the turbine then takes up the load.

The failure of the motor supply, however, does not trip the compensator, as the exciter is kept in operation by the turbine and continues to energize coil 17. When the motor supply is restored the motor merely picks up in speed and takes the load as before. There is no harmful inrush of current to the motor because it is being driven at nearly its full speed by the turbine. Thus upon failure and return of the motor supply, the attention of an attendant is not required, and at the same time relay protection and stop control is provided, the former being responsive to overload in the motor circuit and the latter to other emergency conditions requiring that the motor controlling device be tripped open.

Should the steam supply to the turbine fail while the supply to the motor is cut off, the set will come to rest. The exciter voltage will decrease with decrease in speed and at a certain point, for example approximately 80% of normal, will no longer sufficiently energize coil 17. At such a point the coil 17 will release and permit the compensator to trip and disconnect the motor from the supply. The motor is thus protected against a return of the supply should the set be entirely out of operation through simultaneous failure of the steam and alternating current supply.

When it is desired to stop the set it is merely necessary for a switchboard attendant to signal the operator to cut off the steam supply to the turbine, as the set may then be stopped at the switchboard by decreasing the exciter output voltage by the field control usually provided thereat.

While the present invention is herein described and illustrated in connection with a compensator control for a three unit turbine exciter set as the embodiment at present considered as the best and most practical, it should be understood that it is not limited to such control devices, but may be applied to any control device for a three unit exciter set having either an alternating or direct current generator, a driving motor and an auxiliary prime mover.

What I claim as new and desire to secure by Letters Patent of the United States, is,—

1. The combination with a three unit exciter set comprising a motor, a generator and a prime mover, of means for disconnecting the motor from a supply source of electric energy when the generator voltage falls below a certain subnormal value.

2. The combination with a three unit exciter set comprising a motor, a generator and a prime mover, of a controlling device for the motor movable to a position to connect the motor with an electric current supply, a coil in said device for holding the same in said position when energized, and means connecting said coil with the generator whereby the coil is energized by and under control of the generator.

3. A three unit turbine exciter installation comprising a motor, a generator, and a prime mover with their shafts joined to rotate together, a starting compensator for the motor having an under-voltage release coil for holding said compensator in the running position, characterized by the fact that said under-voltage release coil is connected with and energized by the generator and that protective devices for the motor are provided in the compensator and connected between the generator and said coil, said protective devices operating to disconnect the coil from the generator upon the occurrence of an abnormal operating condition of the motor.

4. The combination with a three unit exciter set comprising a driving motor, a generator, and a prime mover, of a controlling means for the motor interposed between said motor and a supply source of electric energy, said controlling means having a running position into which it may be moved to connect the motor with the supply source, and means energized by electric current from the generator for holding said controlling means in the running position while energized by said generator.

5. The combination with a three unit exciter set comprising a driving motor, a generator, and a prime mover, of a starting compensator for the motor, an under-voltage release coil in the compensator, and means forming a connection between the under-voltage release coil and the generator whereby said coil is energized by the generator.

In witness whereof, I have hereunto set my hand this 9th day of November, 1923.

ELBRIDGE G. DUDLEY.